US009875303B2

(12) United States Patent
Atsmon et al.

(10) Patent No.: US 9,875,303 B2
(45) Date of Patent: Jan. 23, 2018

(54) SYSTEM AND PROCESS FOR BUILDING A CATALOG USING VISUAL OBJECTS

(71) Applicants: Alon Atsmon, Greenwich, CT (US); Dan Atsmon, Rehovot (IL)

(72) Inventors: Alon Atsmon, Greenwich, CT (US); Dan Atsmon, Rehovot (IL)

(*) Notice: Subject to any disclaimer, the term of this patent is extended or adjusted under 35 U.S.C. 154(b) by 65 days.

(21) Appl. No.: 14/753,140

(22) Filed: Jun. 29, 2015

(65) Prior Publication Data

US 2015/0302014 A1      Oct. 22, 2015

Related U.S. Application Data

(63) Continuation of application No. 13/267,464, filed on Oct. 6, 2011, now Pat. No. 9,069,795, which is a continuation-in-part of application No. PCT/IB2010/051507, filed on Apr. 7, 2010.

(60) Provisional application No. 61/290,011, filed on Dec. 24, 2009, provisional application No. 61/288,509, filed on Dec. 21, 2009, provisional application No.
(Continued)

(51) Int. Cl.
*G06K 9/62* (2006.01)
*G06F 17/30* (2006.01)
*G06Q 30/06* (2012.01)

(52) U.S. Cl.
CPC ...... *G06F 17/3071* (2013.01); *G06F 17/3028* (2013.01); *G06F 17/30247* (2013.01); *G06Q 30/0603* (2013.01)

(58) Field of Classification Search
None
See application file for complete search history.

(56) References Cited

U.S. PATENT DOCUMENTS 4,901,731 A    2/1990   Millar
9,069,795 B2   6/2015   Atsmon et al.
(Continued)

FOREIGN PATENT DOCUMENTS

IL      142049      3/2002
IL      168734      2/2006
(Continued)

OTHER PUBLICATIONS

Office Action dated Dec. 20, 2015 From the Israel Patent Office Re. Application No. 215623 and Its Translation Into English.
(Continued)

*Primary Examiner* — Vikkram Bali

(57) ABSTRACT

A method including: clustering a plurality of records, each record comprises at least one object image and at least one textual field associated with the object, to yield a plurality of clusters such that the object images in each cluster exhibit between them a visual similarity above a specified value; associating each cluster with a label by applying a dictionary function to the textual fields of each cluster, wherein the label reflects a common semantic factor of the textual fields of each cluster, wherein the common semantic factor has a value above a specified threshold. Accordingly, the visual similarity provides a measure of resemblances between two visual objects that can be based on at least one of: the fit between their color distribution such as correlation between their HSV color histograms, the fit between their texture, the fit between their shapes, the correlation between this edge histograms and face similarity.

18 Claims, 12 Drawing Sheets

Related U.S. Application Data

61/168,606, filed on Apr. 12, 2009, provisional application No. 61/167,388, filed on Apr. 7, 2009.

(56) References Cited

U.S. PATENT DOCUMENTS

| | | |
|---|---|---|
| 2003/0110181 A1 | 6/2003 | Schuetze et al. |
| 2003/0195883 A1 | 10/2003 | Mojsilovic et al. |
| 2005/0105798 A1 | 5/2005 | Nguyen et al. |
| 2006/0020597 A1 | 1/2006 | Keating et al. |
| 2007/0078846 A1 | 4/2007 | Gulli et al. |
| 2008/0085055 A1* | 4/2008 | Cerosaletti .......... G06F 17/3028 382/225 |
| 2010/0064254 A1 | 3/2010 | Atsmon et al. |
| 2012/0265761 A1 | 10/2012 | Atsmon et al. |
| 2013/0097625 A1 | 4/2013 | Thorwirth et al. |

FOREIGN PATENT DOCUMENTS

| | | |
|---|---|---|
| IL | 171773 | 3/2006 |
| WO | WO 2010/116333 | 10/2010 |

OTHER PUBLICATIONS

International Preliminary Report on Patentability dated Oct. 20, 2011 From the International Bureau of WIPO Re. Application No. PCT/IB2010/051507.

International Search Report and the Written Opinion dated Sep. 2, 2010 From the International Searching Authority Re. Application No. PCT/IB2010/051507.

Notice of Allowance dated Feb. 13, 2015 From the US Patent and Trademark Office Re. U.S. Appl. No. 13/267,464.

Office Action dated Mar. 11, 2015 From the Israel Patent Office Re. Application No. 215623 and Its Translation Into English.

Official Action dated Feb. 4, 2014 From the US Patent and Trademark Office Re. U.S. Appl. No. 13/267,464.

Official Action dated Oct. 16, 2014 From the US Patent and Trademark Office Re. U.S. Appl. No. 13/267,464.

Supplemental Notice of Allowability dated Jun. 3, 2015 From the US Patent and Trademark Office Re. U.S. Appl. No. 13/267,464.

\* cited by examiner

SYSTEM AND PROCESS FOR BUILDING A CATALOG USING VISUAL OBJECTS

RELATED APPLICATIONS

This application is a continuation of U.S. patent application Ser. No. 13/267,464 filed Oct. 6, 2011, which is a continuation-in-part of PCT Patent Application No. PCT/IB2010/051507 having International Filing Date on Apr. 7, 2010, which claims the benefit of priority of U.S. Provisional Patent Application Nos. 61/290,011 filed Dec. 24, 2009, 61/288,509 filed Dec. 21, 2009, 61/168,606 filed Apr. 12, 2009 and 61/167,388 filed Apr. 7, 2009. The contents of the above applications are all incorporated by reference as if fully set forth herein in their entirety.

BACKGROUND a. Technical Field

The present invention relates to catalogs of texto-visual records and more specifically, to generating and maintaining same.

b. Discussion of the Related Art

Texto-visual records constitute any type of data entity that includes at least one visual image of an object and at least one textual filed associated with the visual image. Groups of such records constitute vast amount of data and in order to be able to retrieve and search it efficiently, it is advantageous to store these records, after classifying them, in catalogs that exhibit either visual, functional similarity, or both between the records.

Classifying object images is known in the art and many algorithms for determining the level of visual similarity (or resemblance) of two given images are known and used. However, classifying object images merely based on visual similarity has many drawbacks, For example, these algorithms sometimes fail to determine hidden similarities in which the same object is shown in two images each taken from different angles or views. Additionally, these algorithms usually require a high level of computational resources.

BRIEF SUMMARY

According to an aspect of the present invention, there is provided a method that includes: clustering a plurality of records, each record comprises at least one object image and at least one textual field associated with the object, to yield a plurality of clusters such that the object images in each cluster exhibit between them a visual similarity above a specified value; associating each cluster with a label by applying a dictionary function to the textual fields of each cluster, wherein the label reflects a common semantic factor of the textual fields of each cluster, wherein the common semantic factor has a value above a specified threshold, wherein the visual similarity provides a measure of resemblances between two visual objects that can be based on at least one of: the fit between their color distribution such as correlation between their HSV color histograms, the fit between their texture, the fit between their shapes, the correlation between this edge histograms, face similarity, methods that include local descriptors, the fit between their scaled gray level image such as matrix correlation or Euclidean distance, the fit between their segmented scaled objects of a gray level image, such as objects matrix correlation, the fit between their segmented scaled objects of an edge histogram, and the fit between their segmented scaled objects shape, wherein at least one of the clustering and the associating is executed by at least one processor.

According to another aspect of the invention, there is provided a method comprising: obtaining a group of records having at least one of a representative image and a representative text representing the group, wherein each one of the records comprises at least one object image and at least one textual field associated with the object image; applying a filter function to the records to yield filtering out any of the records in which the object image or the textual field exhibits a visual similarity or a visual similarity combined with a textual similarity below a specified threshold with the representative image or the representative text respectively, wherein at least one of: the obtaining and the applying is executed by at least one processor.

According to yet another aspect of the invention, there is provided a method comprising: obtaining a plurality of records, each record having at least one object image and at least one text field, wherein at least one image is selected to be a representative image of the records; calculating a visual similarity between the representative image and the objects images of the records; and replacing the representative image if the visual similarity is below a specified threshold.

According to yet another aspect of the invention, there is provided a method comprising: applying a copyright-check function to a specified image to determine likelihood of the specified image being copyrighted material, wherein the applying comprises determining a level of changes made to the image after being captured; and indicating the specified image as copyrighted material if the determined level exceeds a specified threshold, wherein a material is determined as copyrighted, based on at least one of: color dominance, symmetry, check for low visual noise; check for dominant color: check for predefined background, check symmetry, check of smooth objects, check of transparency check for watermarks check for significant text: check for retouching, wherein at least one of the applying, the determining, and the indicating is executed by at least one processor.

BRIEF DESCRIPTION OF THE SEVERAL VIEWS OF THE DRAWING(S)

The present invention will now be described in the following detailed description of exemplary embodiments of the invention and with reference to the attached drawings, in which dimensions of components and features shown are chosen for convenience and clarity of presentation and are not necessarily shown to scale. Generally, only structures, elements or parts that are germane to the discussion are shown in the figure.

DETAILED DESCRIPTION

Figure 1:
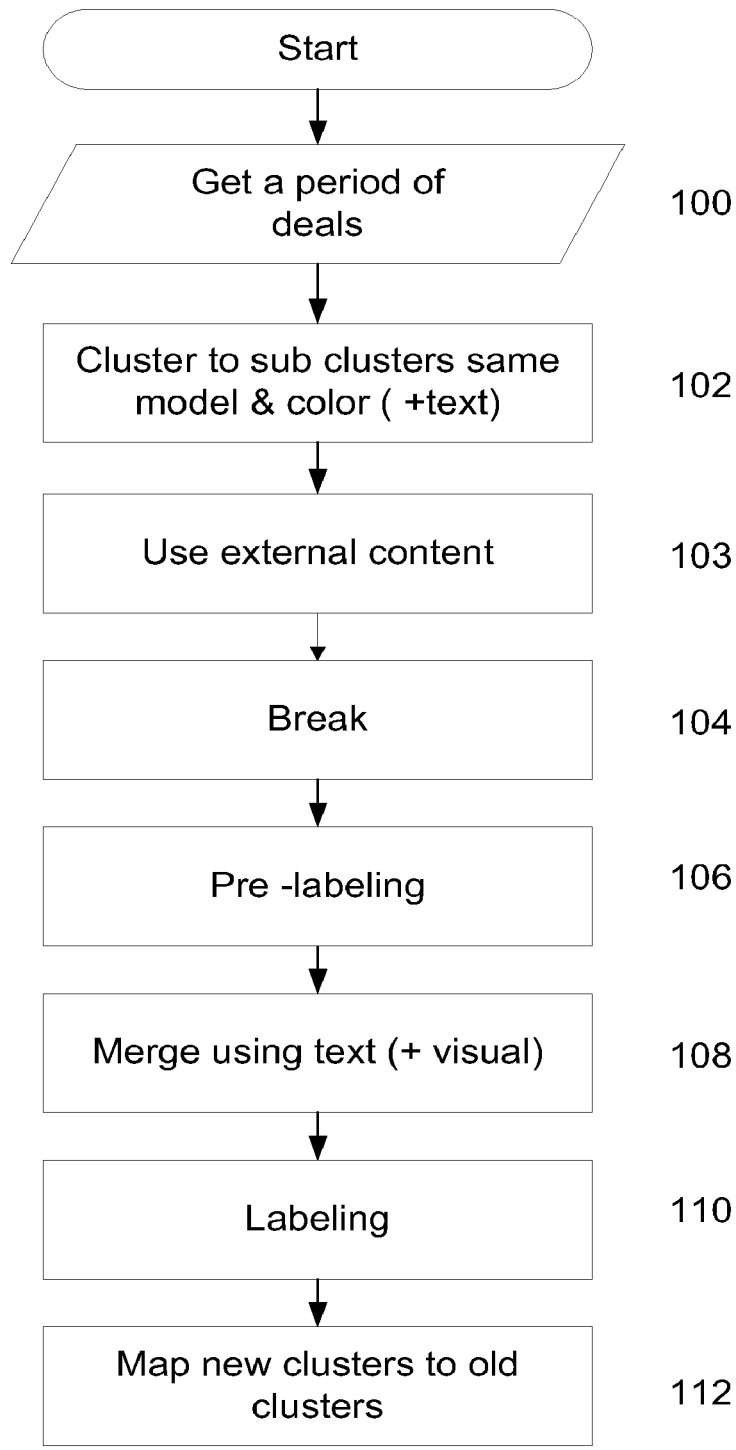
FIG. 1 is a flowchart of acts performed in creating a catalog, in accordance with an exemplary embodiment of the invention.

Provided herein is a detailed description of this invention. It is to be understood, however, that this invention may be embodied in various forms, and that the suggested (or proposed) embodiments are only possible implementations (or examples for a feasible embodiments, or materializations) of this invention. Therefore, specific details disclosed herein are not to be interpreted as limiting, but rather as a basis and/or principle for the claims, and/or as a representative basis for teaching one skilled in the art to employ this invention in virtually any appropriately detailed system, structure or manner.

GLOSSARY OF TERMS

To facilitate understanding the present invention, the following glossary of terms is provided. It is to be noted that terms used in the specification but not included in this glossary are considered as defined according the normal usage of the computer science art, or alternatively according to normal dictionary usage.

Visual object: A content that includes visual information such as images, photos, videos or TV broadcast, video stream, 3D video. Visual objects can be captured using more than one capturing means such as two cameras used for creating a 3D movie.

Visual similarity: the measure of resemblances between two visual objects that can be comprised of:
- The fit between their color distributions such as the correlation between their HSV color histograms
- The fit between their texture
- The fit between their shapes
- The correlation between their edge histograms
- Face similarity
- Methods that include local descriptors such as SIFT or SURF see (en.wikipedia.org/wiki/Scale-invariant_feature_transform)

It should be borne in mind that in certain embodiments of the present technique, visual similarity may provide a measure of resemblances between two visual objects that can be based on at least one of: the fit between their color distribution such as correlation between their HSV color histograms, the fit between their texture, the fit between their shapes, the correlation between this edge histograms, face similarity, methods that include local descriptors, the fit between their scaled gray level image such as matrix correlation or Euclidean distance, the fit between their segmented scaled objects of a gray level image, such as objects matrix correlation, the fit between their segmented scaled objects of an edge histogram, and the fit between their segmented scaled objects shape.

Visual analysis: the analysis of the characteristics of visual objects such, as visual similarity, coherence, hierarchical organization, concept load or density, feature extraction and noise removal.

Text similarity: Measure the pair-wise similarity of strings. Text similarity can score the overlaps found between two strings based on text matching. Identical strings will have a score of 100% while "car" and "dogs" will have close to zero score. "Nike Air max blue" and Nike Air max red" will have a score which is between the two. Further string similarity metrics are described in en.wikipedia.org/wiki/String_metric.

Match: A numerical value that describes the results of the visual similarity and/or text similarity between two or more visual objects, or a logical value that is true in case the similarity is above a certain threshold.

Regular expression: A string that provides a concise and flexible means for identifying strings of text of interest, such as particular characters, words, or patterns of characters. See en.wikipedia.org/wiki/Regular_expression.

Text analysis: the analysis of the structural characteristics of text, as text similarity, coherence, hierarchical organization, concept load or density. (See google.com/search?hl=en&safe=off&rlz=1C1CHMG_enIL291IL303&q=define:text+analysis&btnG=Search). Text analysis can use regular expressions.

Symbol analysis: analysis of symbolic data such as: OCR, hand write recognition, barcode recognition, and QR code recognition.

Capturing data analysis: the analysis of capturing data such as:
X-Y-Z coordinates
3 angles
Manufacturer
Model
Orientation (rotation) top-left
Software
Date and Time
YCbCr Positioning centered
Compression
x-Resolution
y-Resolution
Resolution Unit
Exposure Time
FNumber
ExposureProgram
Exif Version
Date and Time (original)
Date and Time (digitized)
ComponentsConfiguration Y Cb Cr—
Compressed Bits per Pixel
Exposure Bias
MaxApertureValue
Metering Mode Pattern
Flash fired or not
Focal Length
MakerNote
FlashPixVersion
Color Space
PixelXDimension
PixelYDimension
File Source InteroperabilityIndex InteroperabilityVersion derivates of the above such as acceleration in the X-axis Location based analysis: analysis of local data such as GPS location, triangulation data, RFID data, and street address. Location data can for example identify the marketplace or even the specific part of the marketplace in which the visual object was captured.

Content analysis: the combination of text analysis, visual analysis, symbol analysis, location based analysis, Capturing data analysis, and/or analysis of other data such as numerical fields (price range), date fields, logical fields (Female/male), arrays and structures, and analysis history.

Online marketplace: a system or a service that enables trading of goods and services using a computer network. For example: ebay.com, amazon.com, shopping.com.

Data Clustering methods: the assignment of objects into groups (called clusters) so that objects from the same cluster are more similar to each other than objects from different clusters. Often similarity is assessed according to a distance measure. See en.wikipedia.org/wiki/Data_clustering.

Item granularity: is the extent to which a logical item is broken down into smaller parts or the "extent to which a larger entity is subdivided. For example, a shoe model broken into different models, Gender-Age (Men, Women, Boys, Girls, Kids) but to include all relevant colors and sizes within these subcategories.

Category dictionary: A list of words in a specific language, optionally divided into semantically subcategories. For example a car Category dictionary will include the names of common car manufactures, car colors and similar words.

Labeling: Creating a name for a cluster of records. For instance in case we are Labeling a product the label will describe several things about the product—who made it, when it was made, where it was made, its content, how is it to be use and how to use it safely.

Records: data records such as eBay deals. Each record is comprised of fields such as text fields, numeric fields, logical fields, hyperlinks and visual objects.

CID: Cluster identification number, usually this number is a unique number, and unique database key. For example CID can be a product ID (PID). Each CID can include a cluster of records that belong to it (such as by having it's number in their respective CID field).

URL: an address of a file or content on a computer network such as the internet. For example, the URL for NetAlert is netalert.gov.au.

UGC: User-generated content refers to various kinds of media content that is produced or primarily influenced by end-users.

CC: Content with copyright, such as product photos taken by their original manufacturer or merchant.

FIG. 1 is a flowchart of acts performed in creating a catalog, in accordance with an exemplary embodiment of the invention. The flowchart describes a method to cluster a collection of records, not necessarily all of them should contain a visual object. The records can be for example listings or deals of an online marketplace. Step 100 collects a certain number of records, such as a week of eBay listings that include product images and other data such as product title and description. The records are than clustered 102 using the data clustering methods and the similarity metrics Visual similarity of their visual objects. Clustering is done in such a manner that visual objects in most clusters are visually similar. Optionally full content analysis including text similarity for the textual fields is used together with Visual similarity. In addition, other analysis of numerical and/or logical fields can be used such as the difference between two prices fields or a logical field such as Men/Women field. The result will be sub-clusters. Furthermore, external data could be further extracted and used 103 to support the data clustering process. For example, the system could search the deal name for further images of the same item, in case one or a significant part of the top images are similar to other suggested cluster images it will include it in the cluster.

Visual similarity can be adjusted in accordance with the predefined item granularity. For example records with visual object of the same shape but different color could either be included in the same cluster in case the Item granularity defines all records of the same shape but different colors are the same or divided into further sub-clusters in case product granularity is defined differently. As discussed herein, certain embodiments of the present technique, visual similarity may provide a measure of resemblances between two visual objects that can be based on at least one of: the fit between their color distribution such as correlation between their HSV color histograms, the fit between their texture, the fit between their shapes, the correlation between this edge histograms, face similarity, methods that include local descriptors, the fit between their scaled gray level image such as matrix correlation or Euclidean distance, the fit between their segmented scaled objects of a gray level image, such as objects matrix correlation, the fit between their segmented scaled objects of an edge histogram, and the fit between their segmented scaled objects shape.

Optionally the sub-clusters are further broken FIG. 1, 104 into smaller sub-clusters using methods such as textual analysis and Category dictionary in the following manner: supposing we are trying to break a sub-cluster of dresses in which all the product photos look the same but are divided to women dresses and Girl dresses. We will look for the words Women or Girl in each of the textual fields of the records of the sub-cluster and will classify each of them to women dress, Girl dress or undecided. Another example is using regular expressions to identify models in the text as common models are represented by a sequence of alphabetic characters followed by a numeric string.

Optionally the sub-clusters are further pre-labeled FIG. 1, 106. For example, all the records of each sub-cluster are collected, the words in relevant Category dictionary are omitted and the words that appear in the more than ¾ of the records will be used as the label. Optionally dictionary words can now be than be added to the label.

Optionally sub-clusters are further merged FIG. 1, 108 using content analysis such as text similarity and/or Visual similarity. The merge can use either the text similarity of the pre labels, and/or full content analysis of the records in each sub-cluster. For example, in case sub-cluster1 contains side views of Product1 and sub-cluster2 contains top views of Product1 but the label given to them in step 106 is identical or 90% similar than both of them will be united to the same sub-cluster (for example sub-cluster1). Another example is using a regular expression to identify models in more than one cluster text as common models are represented by a sequence of alphabetic characters followed by a numeric string and unite those clusters. Optionally the sub-clusters are further labeled 110 to use the extra information added in previous steps to improve the labels. The order in which steps 102 to 110 are performed could be changed. Furthermore, some of the steps are optional. At any rate the clusters created at the end of the steps are called new-clusters.

In many cases the record database we are handling already has a list of clusters which are comprised of:
- labels
  - logical definition of which records belong to them and the records that belong to them
- representative images or images Optionally, a further step 112 will be taken to map the new clusters to the old clusters different system of clusters using:
- I. Visual similarity: mapping new cluster1 to old cluster1 as most of the images in both clusters are identical or visually similar.
- II. Text analysis: mapping new cluster1 to old cluster1 as labels of both clusters are identical or contain 10 words and are different only in one word.
- III. A combination of I and II.

For example, a 1 week of eBay deals can be used in step 100, all the red Adidas model X shoes are gathered using Visual similarity in sub-cluster1, and all the blue ones in sub clsuter2 in step 102. In step 110, sub clsuter1 and sub-cluster 2 are united using the brand and model names. It should be noted that even deals that had no model name but the right product photo will benefit from that as they got included in the right cluster in step 102. The results called new cluster 1 can later on be classified to current eBay product number of eBay Adidas model x shoes in step 112.

Figure 2:
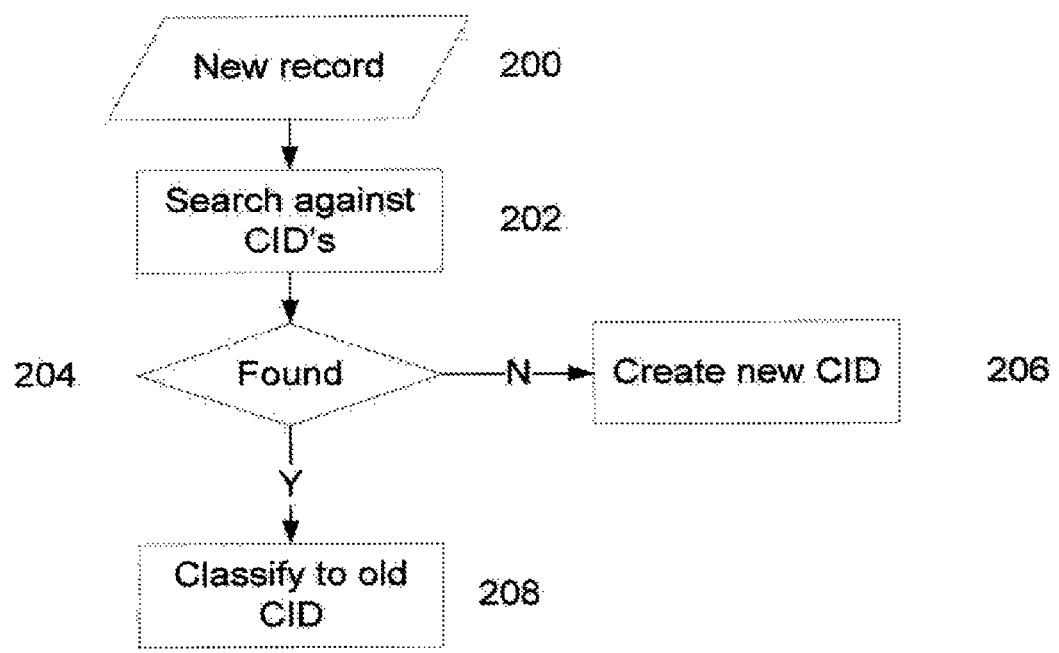
FIG. 2 is a flowchart of acts performed in processing a new record, in accordance with an exemplary embodiment of the invention.

FIG. 2 is a flowchart of acts performed in processing a new record, in accordance with an exemplary embodiment of the invention. When a new record is read 200, it is searched 202 against a cluster list. The CID list could be the new clusters created in steps 102 to 110 of FIG. 1, or old clusters such as discussed in step 112. The search can use Visual similarity and/or text similarity. Accordingly, the Visual Similarity may provide a measure of resemblances between two visual objects that can be based on at least one of: the fit between their color distribution such as correlation between their HSV color histograms, the fit between their texture, the fit between their shapes, the correlation between this edge histograms, face similarity, methods that include local descriptors, the fit between their scaled gray level image such as matrix correlation or Euclidean distance, the fit between their segmented scaled objects of a gray level image, such as objects matrix correlation, the fit between their segmented scaled objects of an edge histogram, and the fit between their segmented scaled objects shape. A decision is then made 204: in case the new record was found in the CID list it is further classified 208 such as given a CID. In case it is not found a new cluster 206 such as a new CID is created.

Figure 3:
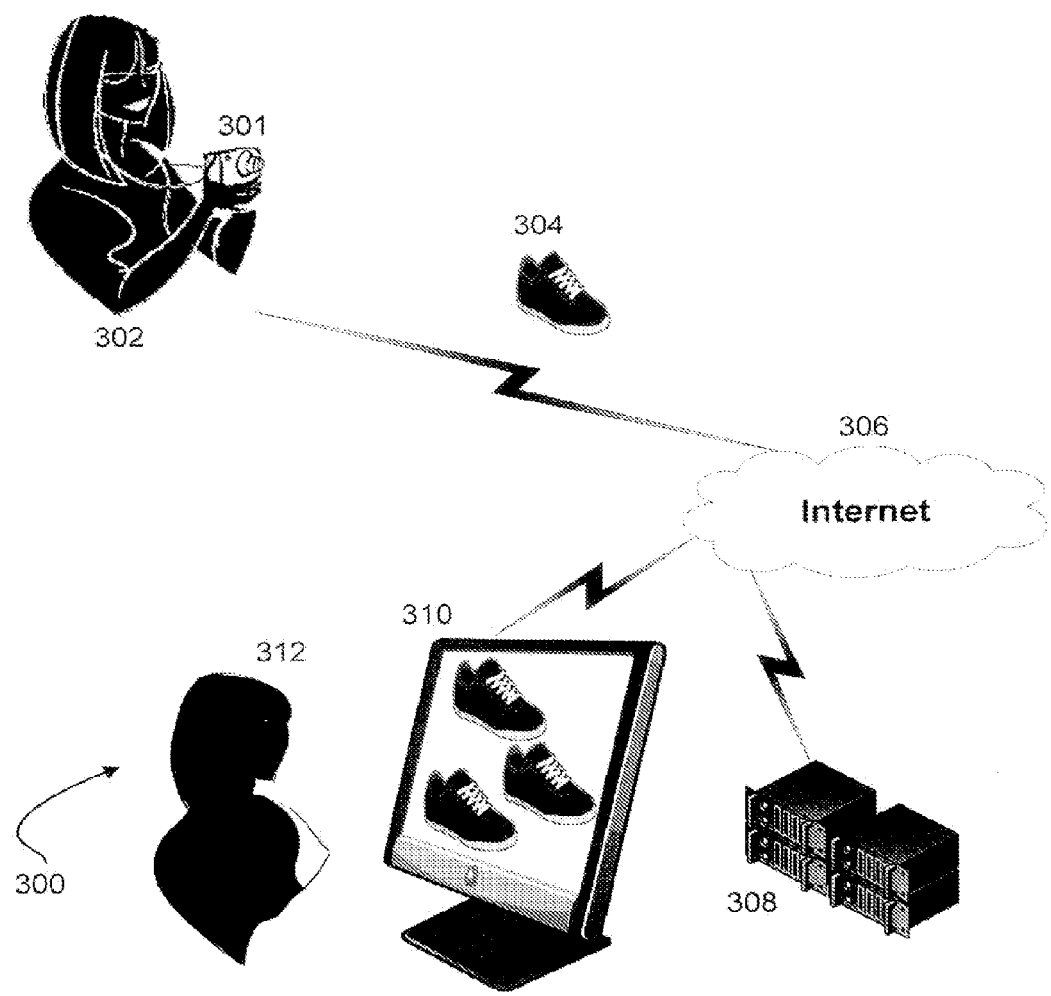
FIG. 3 is a scheme describing the cataloging system and process in accordance with an exemplary embodiment of the invention.

FIG. 3 is a scheme describing the Cataloging system and process in accordance with an exemplary embodiment of the invention. System 300 performs the process described hereinafter: person 302 captures using capturing means 301 a visual object of tangible object 304. The Visual object is sent over a network 306 such as the internet to a processing system 308. Processing system is comprised of multiple processing units configured to allow larger scale processing. In some cases it contains multi-core processors. System 308 runs the modules of system 400. Partial or full results are sent over network such as 306 to a user terminal 310. User terminal 310 displays the results, such as clustering results to user 312.

Figure 4:
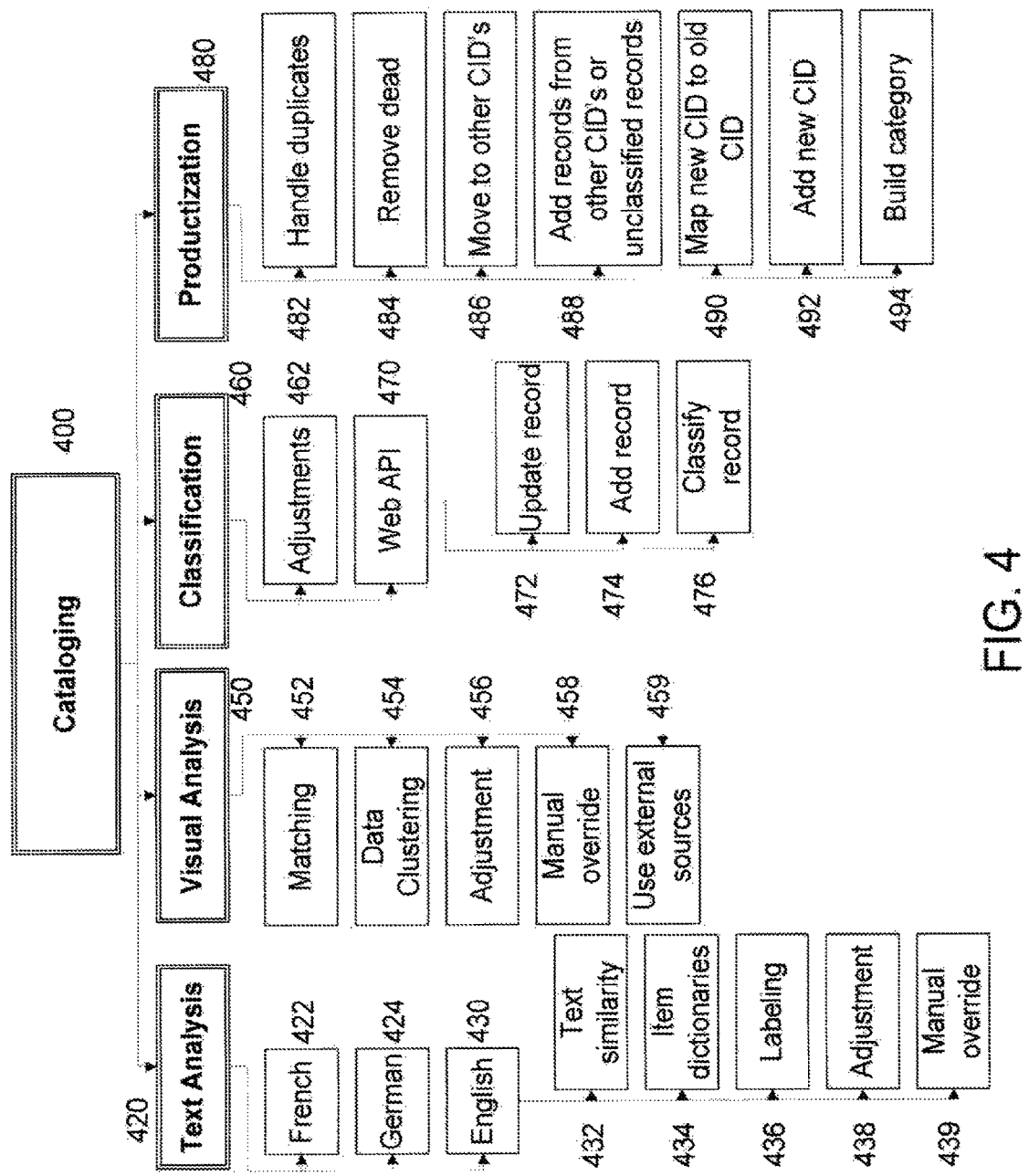
FIG. 4 is a scheme describing the main modules in the systems, in accordance with an exemplary embodiment of the invention.

FIG. 4 is a scheme describing the main modules in the systems, in accordance with an exemplary embodiment of the invention. The Cataloging system 400 is a computerized and automatic system. It can run on one or more computers and in some cases on multiple computers of multiple processors each. The system creates results that change the looks of a cataloging system. The system is comprised of the following modules:
- Text Analysis module 420 that is further comprised of several language sub modules such as:
  - French language sub module 422
  - German language sub module 424
  - English language sub module 430 that is further comprised of
    - Text similarity function 432 performing actions such as those described in steps 102 and 108
    - Category dictionary sub module 434 for creating and maintain Category dictionaries such as the one used in steps 104, 106 and 110.
    - Labeling sub module 436 such as the one used in steps 106 and 110.
    - Adjustment sub module 438 to adjust system parameters such as false positive or false negative thresholds.
    - Manual override sub module 439 that allows to describe specific or general cases that should have a handling different than the usual one
- Visual analysis module 450 that is further comprised of:
  - Visual similarity module 452 that is used in steps 102, 108 and 112 of FIG. 1.
  - A data clustering sub module 454 such as the one used in step 102.
  - Adjustment sub module 456 to adjust system parameters such as false positive or false negative thresholds or relative .weight of shape texture and color for each category or for the whole system.
  Accordingly, the above mentioned Visual Similarity may provide a measure of resemblances between two visual objects that can be based on at least one of: the fit between their color distribution such as correlation between their HSV color histograms, the fit between their texture, the fit between their shapes, the correlation between this edge histograms, face similarity, methods that include local descriptors, the fit between their scaled gray level image such as matrix correlation or Euclidean distance, the fit between their segmented scaled objects of a gray level image, such as objects matrix correlation, the fit between their segmented scaled objects of an edge histogram, and the fit between their segmented scaled objects shape.
  - Manual override sub module 458 that allows to describe specific or general cases of visual objects that should have a handling different than the usual one.
  - External data sub module 459 that allows using information retrieved using the textual data of a record to receive further visual objects to support decisions a such as the data clustering decision of step 102.
- Classification module 460 that is mainly used to classify new records in compliance with the catalog such as the CID list and is comprised of:
  - Adjustment sub module 462 to adjust system parameters such as false positive or false negative thresholds or relative weight of shape text similarity vs. visual similarity and color for each category or for the whole system.
- A sub module 470, that will most likely be a web API system the uses 420 and 450 for functions such as:
  - 472 updating a record
  - 474 adding a record
  - 476 classifying a record using 450 and/or 420 into one or more of the CID's of 480. For example if the record visual object of the new record has 99% visual similarity and 90% text similarity to the one or more of the representative visual objects of CID 1234 it will be classified to CID 1234 by setting it CID field to 1234.

A classification module 480 that is used to create and maintain a collection of CID such as product catalog and is comprised of the following sub modules:

482 a sub module to handling duplicate CID's, for example it would compare two CID's records and find using text/visual similarity that those records have a 99% similarity score, hence they two CID are duplicates and would subsequently refer one of them to the other one

484 a sub module to remove a dead CID, for example if for a period of 3 months no records where, or no records should have been classified using 460 to this CID.

486 a sub module to analyze the records of a certain CID and analyze them according to 450 and/or 420 and decide to classify them to another CID.

488 a sub module to add records carrying no CID or another CID to a different CID. This will solve the problem of unclassified or misclassified records. This module can use 476.

490 a sub module to map new cluster to old clusters such as the one described in 112, FIG. 1.

492 a sub module to automatically add a new CID such as the one described in FIG. 2 in general and in specific in 206, a manual process is also an optional

494 a sub module to build or rebuild a category. Such sub module will take a list of records of a category and use 470, 450 and 454 in particular and 420 to build a CID list out of them.

Figure 5:
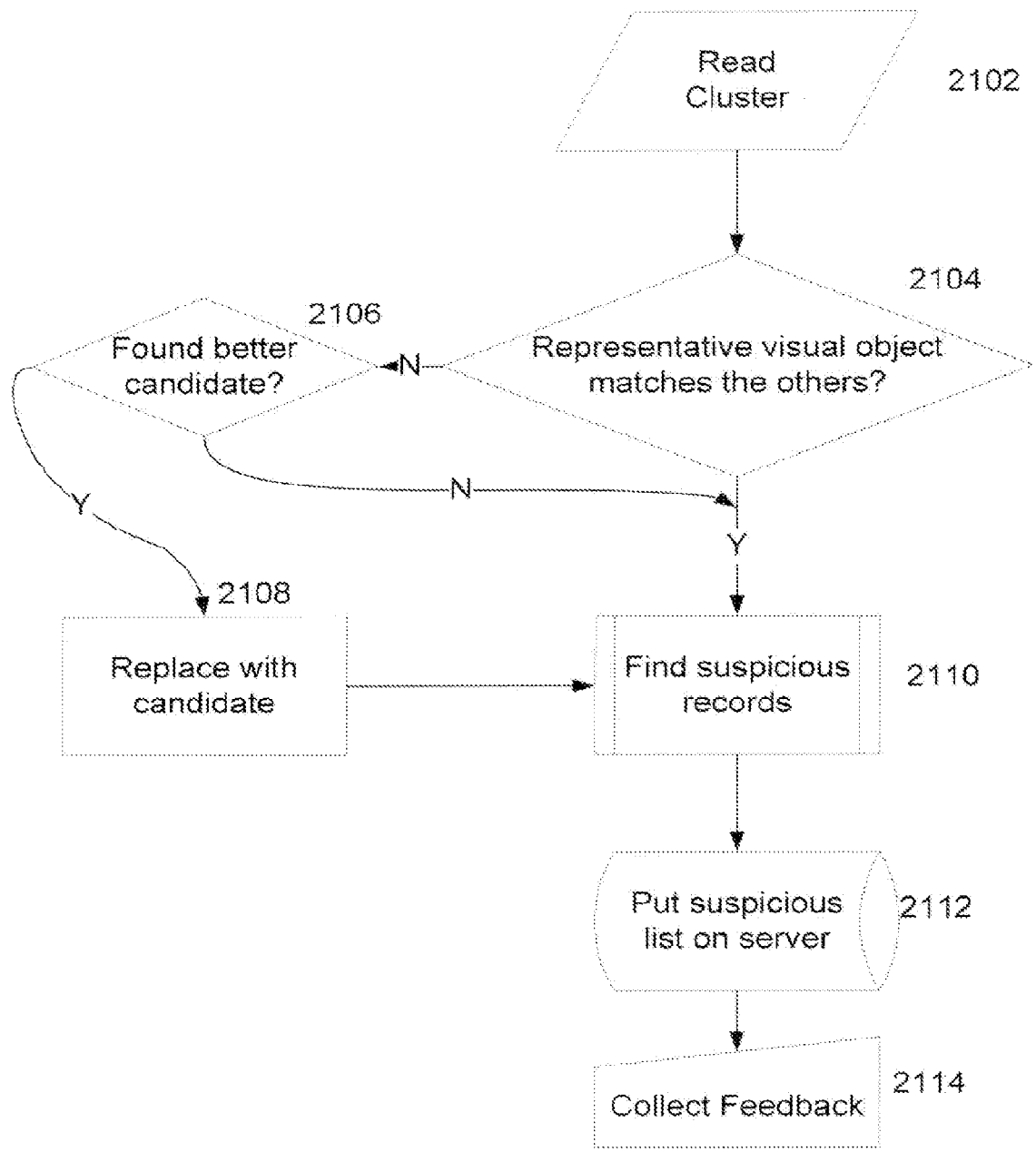
FIG. 5 is a flowchart of acts performed in cleaning a catalog, in accordance with an exemplary embodiment of the invention.

FIG. 5 is a flowchart of acts performed in cleaning a catalog, in accordance with an exemplary embodiment of the invention. The flowchart describes a method to cluster a collection of records, not necessarily all of them should contain a visual object. The records can be for example listings or deals of an online marketplace. Step 2102 collects a cluster of records, such all the concurrent deals shopping.com of a certain PID. A check is than done in steps 2104-2108 to decide whether to replace the representative visual object of a CID. The check uses content analysis in general and visual similarity in particular. For example if the RVO matches over 90% of the visual objects of the records in its CID than it is regarded "matched". Furthermore, it should be borne in mind that such visual similarity provides a measure of resemblances between two visual objects that can be based on at least one of: the fit between their color distribution such as correlation between their HSV color histograms, the fit between their texture, the fit between their shapes, the correlation between this edge histograms, face similarity, methods that include local descriptors, the fit between their scaled gray level image such as matrix correlation or Euclidean distance, the fit between their segmented scaled objects of a gray level image, such as objects matrix correlation, the fit between their segmented scaled objects of an edge histogram, and the fit between their segmented scaled objects shape.

In case the match in 2104 is not good, a better candidate is looked for 2106 by searching RVO for a CID visual object with better match to the visual object of the CID records. In case a better match is found the RVO is replaced 2108 by that RVO candidate. For example if the dell 9999 photo matches only 50% in of the images of the PID deals, and one of the images records matches 95% of the images with 95% average certainty, the RVO will be replaced by that image.

Later on the RVO is used 2110 to find suspicious records as described in FIG. 6. The suspicious records list is then optionally uploaded 2112 to a remote server for further automatic or manual analysis. Further feedback can then be collected 2114 to decide if the suspicious records were indeed misclassified. In case they were indeed misclassified they are added to the "opt out list", or else added to the "opt in list". Those lists are not general and each CID has its own lists.

Figure 6:
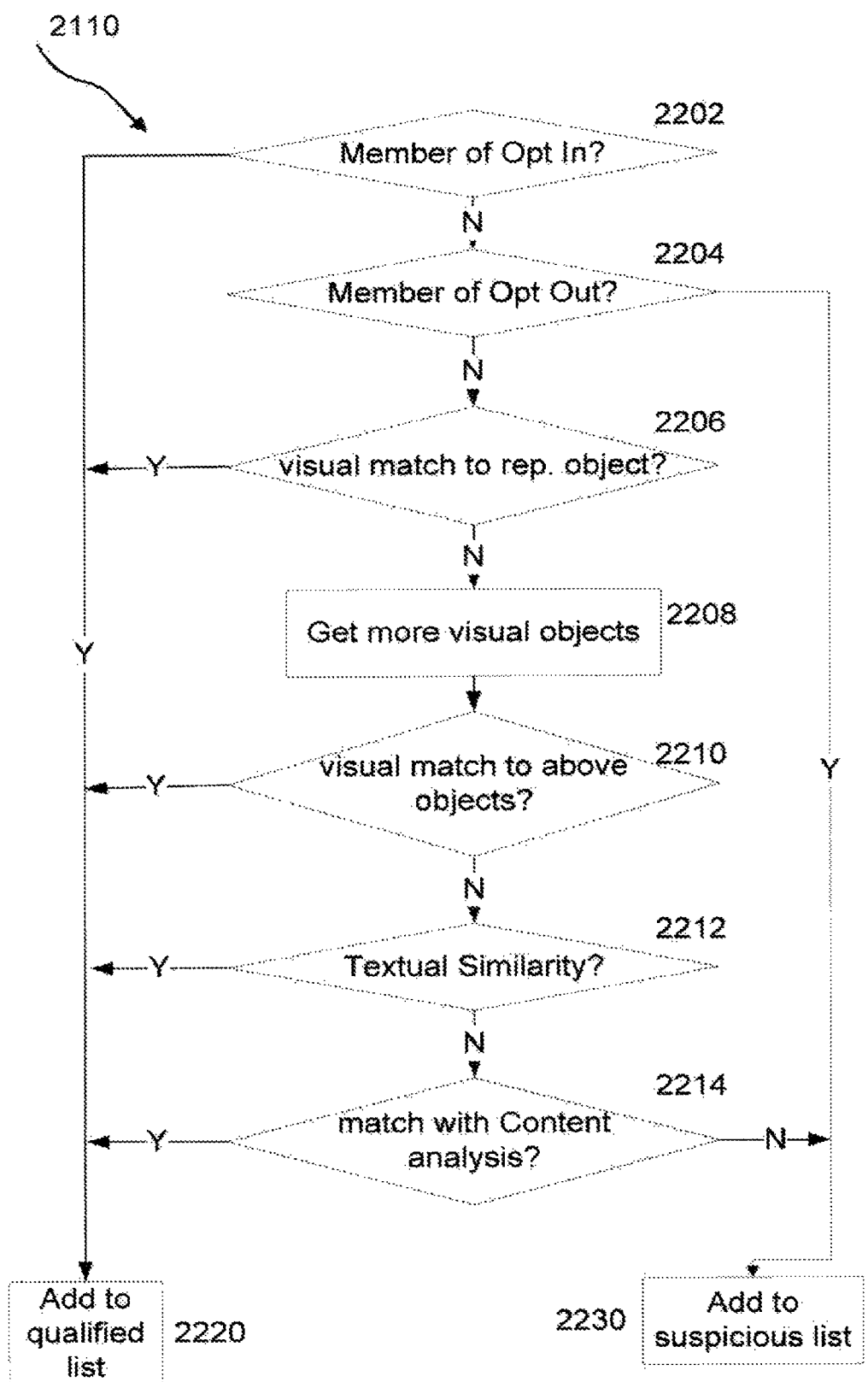
FIG. 6 is a flowchart of acts performed in finding suspicious records, in accordance with an exemplary embodiment of the invention.

FIG. 6 is a flowchart of acts performed in finding suspicious records, in accordance with an exemplary embodiment of the invention. The figure further describes the steps of 2110: a check is done 2202 to see whether each CID record has a match to an "opt in list", the check as well as the checks described in the following steps:

2204—if record's object has a match to visual object in an opt out list execution passes to step 2230

2206—if record's object has a match to RVO execution passes to step 2220

2210—if record's visual object has a visual match to the RVO plus the visual objects obtained in step 2208 execution passes to step 2220

2212—if record's visual object has textual match to the RVO plus the visual objects obtained in step 2208 execution passes to step 2220. For example, matching the title of the record to the title of the CID.

2212—if record's visual object has content analysis match to the RVO plus the visual objects obtained in step 2208 execution passes to step 2220. For example matching price filed of the record to the price range of the CID.

In step 2208, the records' fields, for example the record title and/or its image are used to search for similar object in other databases, for example amazon.com or goggle images. In visual object of the record is visually similar above a certain predefined threshold tone or more visual objects of the predefined top results of search results 2220 is performed. The order of steps 2202-2214 is arbitrary and all the steps are optional or can be done if a different order. In step 2220 record is added to qualified records list. In step 2230 record is added to suspicious records list.

Figure 7:
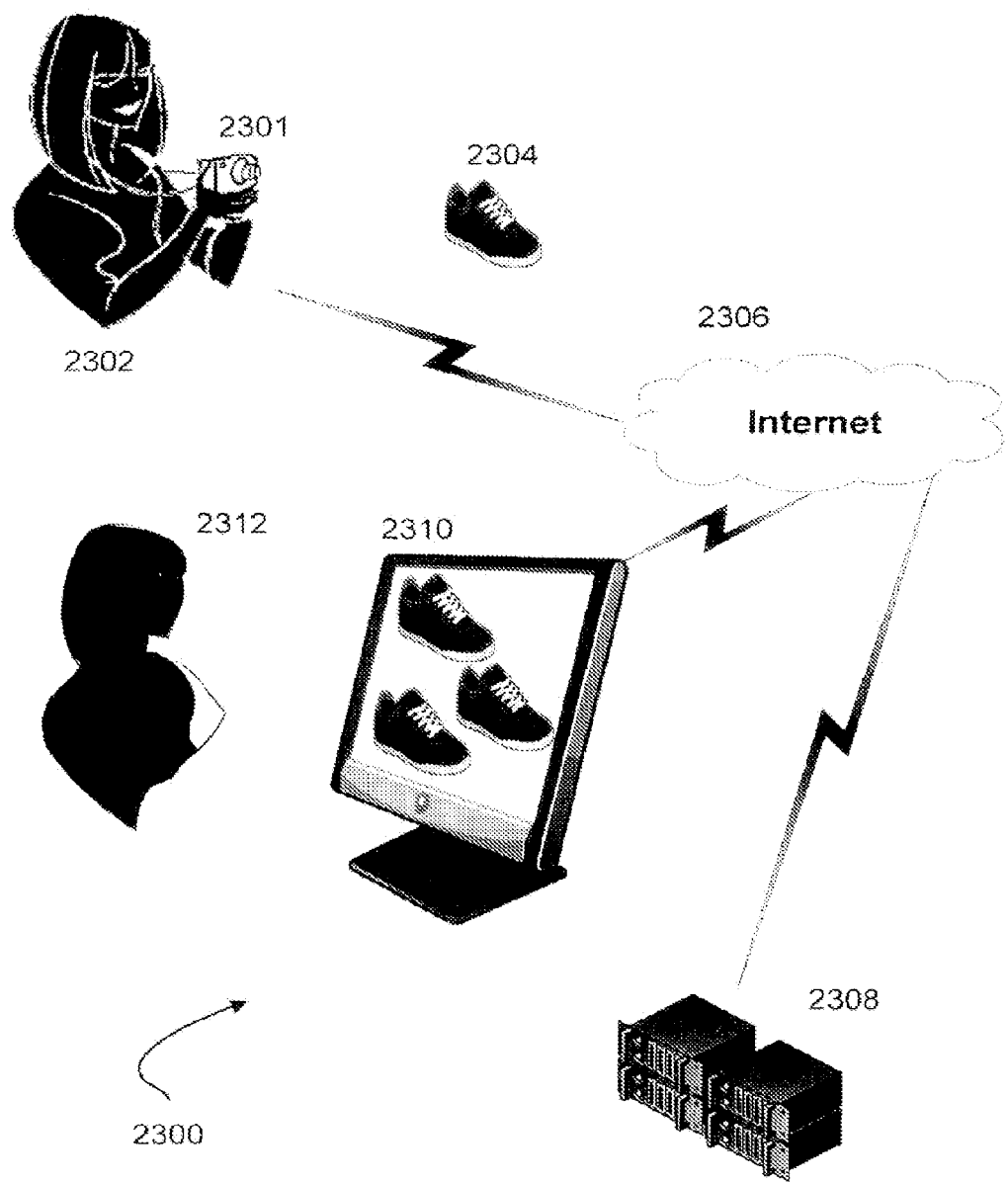
FIG. 7 is a scheme describing the Noise removal system and process in accordance with an exemplary embodiment of the invention.

FIG. 7 is a scheme describing the Noise removal system and process in accordance with an exemplary embodiment of the invention. System 2300 performs the process described hereinafter: Person 2302 captures using capturing means 2301 a visual object of tangible object 2304. The Visual object is sent over a network 2306 such as the internet to a processing system 2308. Processing system is comprised of multiple processing units configured to allow larger scale processing. In some cases it contains multi-core processors. System 2308 runs the modules of system 2400. Partial or full results are sent over network such as 2306 to a user terminal 2310. User terminal 2310 displays the results, such as noise removal results to end user 2312.

Figure 8:
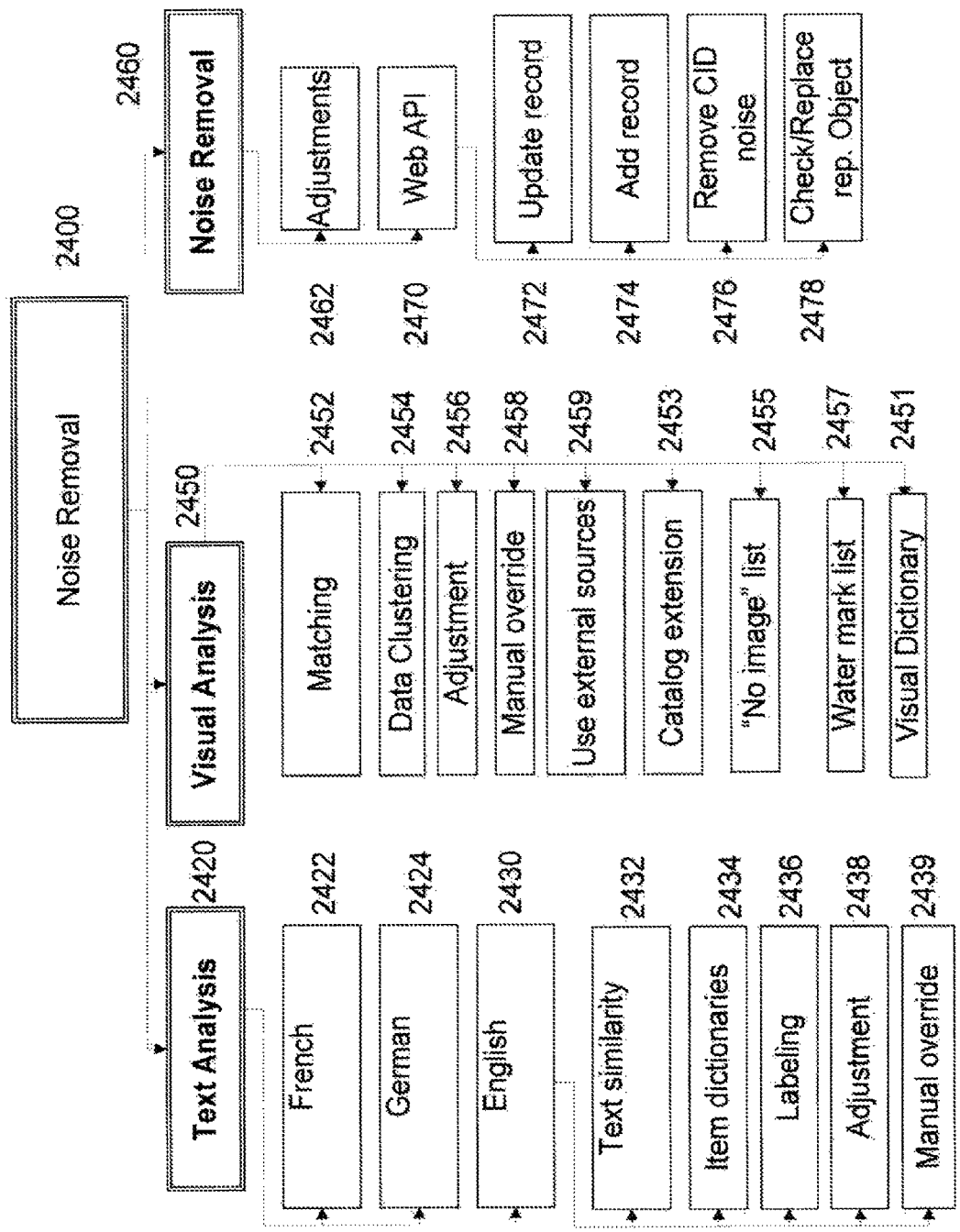
FIG. 8 is a scheme describing the main modules in the systems, in accordance with an exemplary embodiment of the invention.

FIG. 8 is a scheme describing the main modules in the systems, in accordance with an exemplary embodiment of the invention. The Noise removal system 2400 is a computerized and automatic system. It can run on one or more computers and in some cases on multiple computers of multiple processors each. The system creates results that change the looks of a cataloging system. The system is comprised of the following modules:

Text Analysis module 2420 that is further comprised of several language sub modules such as:
French language sub module 2422
German language sub module 2424

English language sub module 2430 that is further comprised of

Text similarity function 2432 performing actions such as those described in steps 2102 and 2108

Category dictionary sub module 2434 for creating and maintain Category dictionaries such as the one used in steps 2104, 2106 and 2110.

Labeling sub module 2436 such as the one used in steps 2106 and 2110.

Adjustment sub module 2438 to adjust system parameters such as false positive or false negative thresholds.

Manual override sub module 2439 that allows describing specific or general cases that should have a handling different than the usual one. For example opt in and/or opt out lists.

Visual analysis module 2450 that is further comprised of:

Visual similarity module 2452 that is used in steps 2102, 2108 and 2112.

As discussed herein visual similarity provides a measure of resemblances between two visual objects that can be based on at least one of: the fit between their color distribution such as correlation between their HSV color histograms, the fit between their texture, the fit between their shapes, the correlation between this edge histograms, face similarity, methods that include local descriptors, the fit between their scaled gray level image such as matrix correlation or Euclidean distance, the fit between their segmented scaled objects of a gray level image, such as objects matrix correlation, the fit between their segmented scaled objects of an edge histogram, and the fit between their segmented scaled objects shape.

A data clustering sub module 2454 such as the one used in step 2102.

Adjustment sub module 2456 to adjust system parameters such as false positive or false negative thresholds or relative .weight of shape texture and color for each category or for the whole system.

Manual override sub module 2458 that allows describing specific or general cases of visual objects that should have a handling different than the usual one, for example opt in and/or opt out lists. Such lists could also be maintained using crowd sourcing, for example in case the majority of users require adding an item to an opt out list it will be added there.

External data sub module 2459 that allows using information retrieved using the textual data of a record to receive further visual objects to support decisions a such as the data clustering decision of step 2102.

Catalog extension sub module 2453 that adds visual object to a CID using the suspicious list such as the one created in 2230 and is further detailed in FIG. 5.

"No image list" sub module 2455 that collects a group of visual objects that mark that a specific record does not contain a valid visual object, such as image showing the word "No Image" on a white background and Logos. The system can for example avoid processing the records with object in processes such as 2110.

"Water mark list" sub module 2457 that collects a group of visual objects that mark that a specific record is copyrighted and cannot be used, such as image showing the word "Copyright" in the background of a product photo or an invisible water mark. The system can for example avoid using these visual objects as candidates in steps 2106 and/or 2108.

"Dictionary List" sub module 2460 that groups visual object which describes how the product looks like, for example a set of pictures which show an LCD TV from several angles. The module can for example avoid processing the records with visual similar objects in processes such as 2110.

2460 Noise removal module that is mainly used to check the classification of CID records in compliance with the catalog such as:

Adjustment sub module 2462 to adjust system parameters such as false positive or false negative thresholds or relative .weight of shape text similarity vs. visual similarity and color for each category or for the whole system.

A sub module 2470, that will most likely be a web API system the uses 2420 and 2450 for functions such as:

2472 updating a record

2474 adding a record

2476 Removing CID noise using 2450 and/or 2420 and as detailed in FIG. 5 and FIG. 6. Misclassified records can then be reclassified to another CID. For example if the visual object of record has 99% visual similarity and 90% text similarity to the one or more of the RVO of CID 1234 it will be classified to CID 1234 by setting it CID field to 1234.

2478 checking replacing representative objects as further described in steps 2104-2210.

Figure 9:
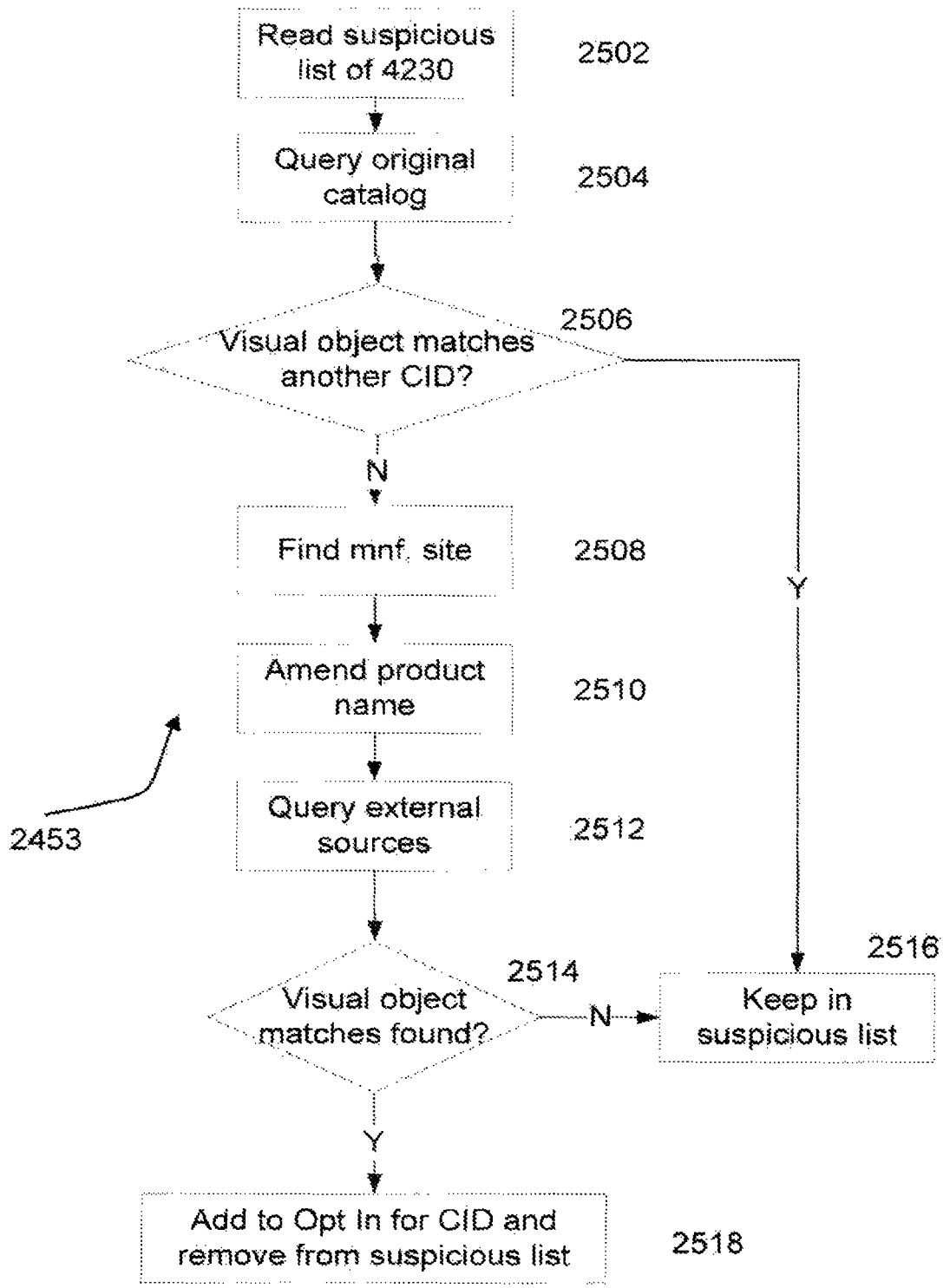
FIG. 9 is a flowchart of acts performed in further processing suspicious records, in accordance with an exemplary embodiment of the invention.

FIG. 9 is a flowchart of acts performed in further processing suspicious records, in accordance with an exemplary embodiment of the invention. The process 2453 is performed on list 2230 as follows: a record from a suspicious record list such as the one created in step 2230 is read 2502 and then, the original data such as product name of the record or the visual object is used to query 2504 the original catalog such as the mark place's product catalog. In case the query results show a visual object that shows 2506 a visual similarity above a predefined threshold to the visual object of the suspicious record, it probably means that suspicious record should have been classified to that CID and the record is kept 2516 in the suspicious list. If not an optional step 2508 is performed in which the source site of the visual object is estimated. Than can be done example by querying a search engines such as Google image search with the text of the record, and finding that a specific site appears in a portion of the URL of returned results that is above a predefined threshold and does not belong to a known site preclusion list such as Flickr.com, Picasa.com, eBay.com. The resulting site is used as one of the external sources of step 2512. As another preparatory step 2510 is performed before and/or after step 2508, in that step, the record data is amended to improve query results. For example some words can be removed from the product name in order to increase the number of results received in step 2512. Step 2510 can be further repeated after step 2512 in case not enough valid results are returned in step 2512. In step 2512 further external sources are queried using the record data, for example if the catalog we are handling is shopping.com's catalog an external source would be amazon.com, pricegrabber.com, the manufacturer site found in step 2508. In case a visual and/or text similarity above a predefined threshold is found 2514 to the record the record is added 2518 to opt in list and removed from suspicious list. That means for example that in further processing if the product photo will be added to the product photo list of the CID. In case no match is found, the record would remain 2516 in the suspicious list. It is noted that the process of 2453 can be either automatic manual or semi-automatic and the order of steps 2502 to 2518 is optional and other orders of the actions are possible as well.

Figure 10:
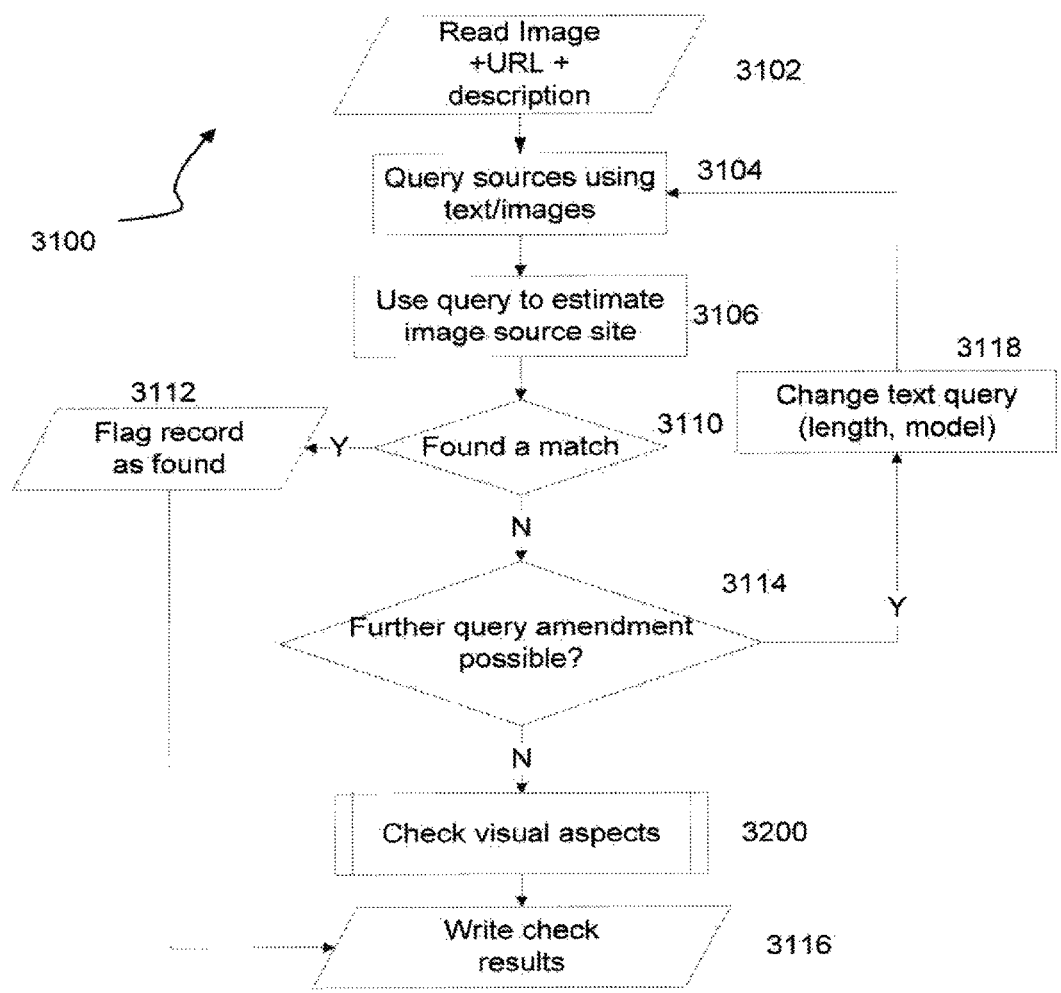
FIG. 10 is a flowchart of acts performed in cleaning a catalog, in accordance with an exemplary embodiment of the invention.

FIG. 10 is a flowchart of acts performed in checking a record, in accordance with an exemplary embodiment of the invention. The flowchart describes a process and system 3100 to check records that contain a visual object. The records can be for example listings or deals of an online marketplace.

Step 3102 reads the input data, data is comprised of:
A visual object file such as an image
A URL from which a visual object can be downloaded.
A description of the visual object such as a product name or a model name Step 3104 queries various sources with a search query using the information of step 3102 such as a product name or photo. The queried sources can be for example:
 image search engines such as Google or Bing image search
 marketplace such as eBay, Amazon, Alibaba, PriceGrabber
 text search engines
Source site can be searched in several ways:
1) By crawling (Using a computer program that browses the World Wide Web in a methodical, automated manner) the site and downloading or just indexing all the visual objects in that site.
2) Using the search option that limits a search engine search to a specific site such as "site:www.XXX.com"
3) By using a pre-prepared visual object repository.
4) Using any on the above in combination with visual search features such as color filters, and similar photo search.

Optionally, query results of 3104 can be further used in step 3106 to estimate the source of the visual object. For example if 11 of the first 20 query results of searching for a "Garmin fitness watch" in Google images return the URL garmin.com (excluding predefined list such as ebay.com, shopping.com, amazon.com) that probably means that the source site for the item, in this case a Garmin fitness watch, comes from that manufacturers' site optional a visual similarity criteria can be applied to the images returned to filter out results that do not represent the required product. In that case step 3104 will be performed again while using the source site as the source.

In case a match is found 3110 the record is reported 3112 as copyrighted or found (with the exception of precluded sites such as finding the object in the URL of URL group of the original record), if not step 3114 is performed. In accordance with the present technique, it should be borne in mind that in determining whether a material is copyrighted, is based on determining at least one of: color dominance, symmetry, check for low visual noise; check for dominant color: check for predefined background, check symmetry, check of smooth objects, check of transparency check for watermarks check for significant text: check for retouching, wherein at least one of the applying, the determining, and the indicating is executed by at least one processor.

Step 3114 checks whether query can be amended in order to find a match. In case the answer is negative step 3200 is performed; in case the answer is positive, the query is amended 3118—for example certain words can be removed from the query, images can be amended (for example cropped), model names can be used as a query (such as using words that show a close combination of alphabetic letters and numbers above a predefined length such as "Inspiron 650" or "XXX123"). In case the record consists of further textual fields such as manufacturer name or category name those can be used in amending the query as well.

Figure 11:
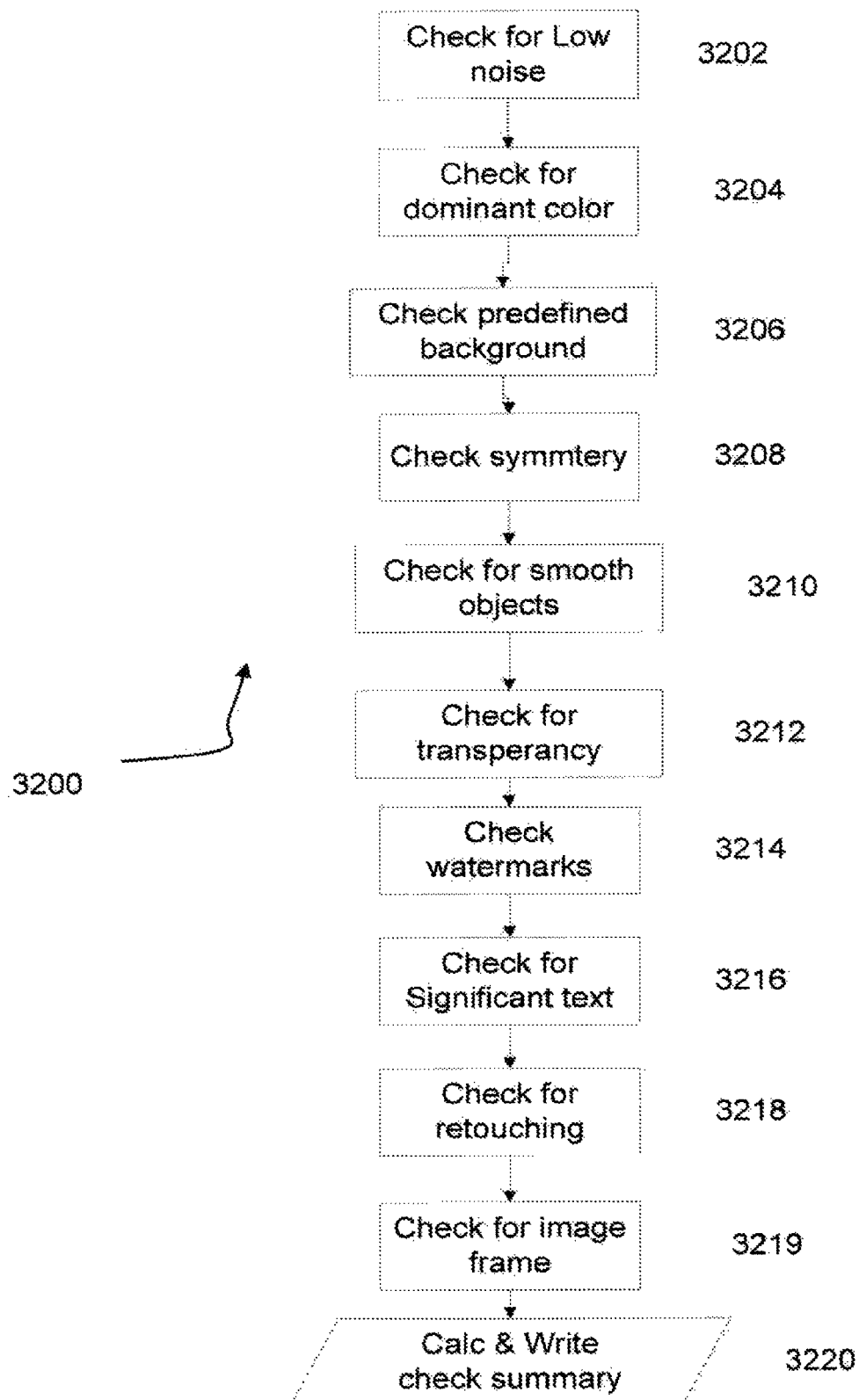
FIG. 11 is a flowchart of acts performed in finding suspicious records, in accordance with an exemplary embodiment of the invention.

In step 3200 the acts described in FIG. 11 are performed. After step 3114 or after step 3112 that check results are written 3116. Check results can be either:
Found—the record was found in the process
Not found but risky (see process 3200)
Not found and no risk
URL did not return a valid object FIG. 11 is a flowchart of acts performed in checking a record in accordance with an exemplary embodiment. The flowchart describes a process and system 3200 to check records for being copyrighted. The following checks are performed not necessarily in the described order:
 3202: Check for low visual noise: UGC have higher frequency than CC of visual noise as they contain noisy backgrounds and lower quality images (blurry). A measure of noise can be for example the standard deviation of a grayscale image
 3204: Check for dominant color: CC has higher then UGC frequency of dominant colors, such as a result of text included in the image itself.
 3206: Check for predefined background, CC has higher than UGC frequency of neutral background such as white background hence a high percentage of white color in an image is an indicator of CC.
 3208: Check symmetry, CC has higher then UGC frequency of symmetrical photos as photo is taken in more controlled environments. Symmetry can be calculated for example by the correlation coefficient of the right and left part of an image.
 3210: Check of smooth objects: CC has higher then UGC frequency of smooth objects as a result of image editing that smoothes the images. A measure of smoothness is for example the deviation of a contour from a straight line—the lower the deviation the smoother the contour.
 3212: Check of transparency: CC has higher then UGC frequency of transparency in an image used for example to water mark and image of add a text. Transparency can be found using the alpha channel of an image.
 3214: Check for watermarks: CC has higher then UGC frequency of watermarks, those could be found for example by comparing the image to a set of known watermarks or their visual signature.
 3216: Check for significant text: CC has higher then UGC frequency of text in an image, those could be found for example using an OCR module. Or a high presence of a discrete color (for example one with constant RGB values)
 3218: Check for retouching: CC has higher then UGC frequency of retouching (image editing). Checks can be for example the check in 3212.
 3219: Check for image frame: CC has higher then UGC frequency of image frames around the main object, the frames are of solid color with single or very close value of RGB.

In step 3220 the checks of 3202-3219 are summarized using a formula such as max, average of both and a final numerical risk of being CC and/or a logical value indicating whether numerical value crossed a predefined threshold is written or passed on to step 3116. Further, in accordance with the present technique material forming the above records is determined as copyrighted, based on at least one of: color dominance, symmetry, check for low visual noise; check for dominant color: check for predefined background, check symmetry, check of smooth objects, check of transparency check for watermarks check for significant text:

check for retouching, wherein at least one of the applying, the determining, and the indicating is executed by at least one processor.

Figure 12:
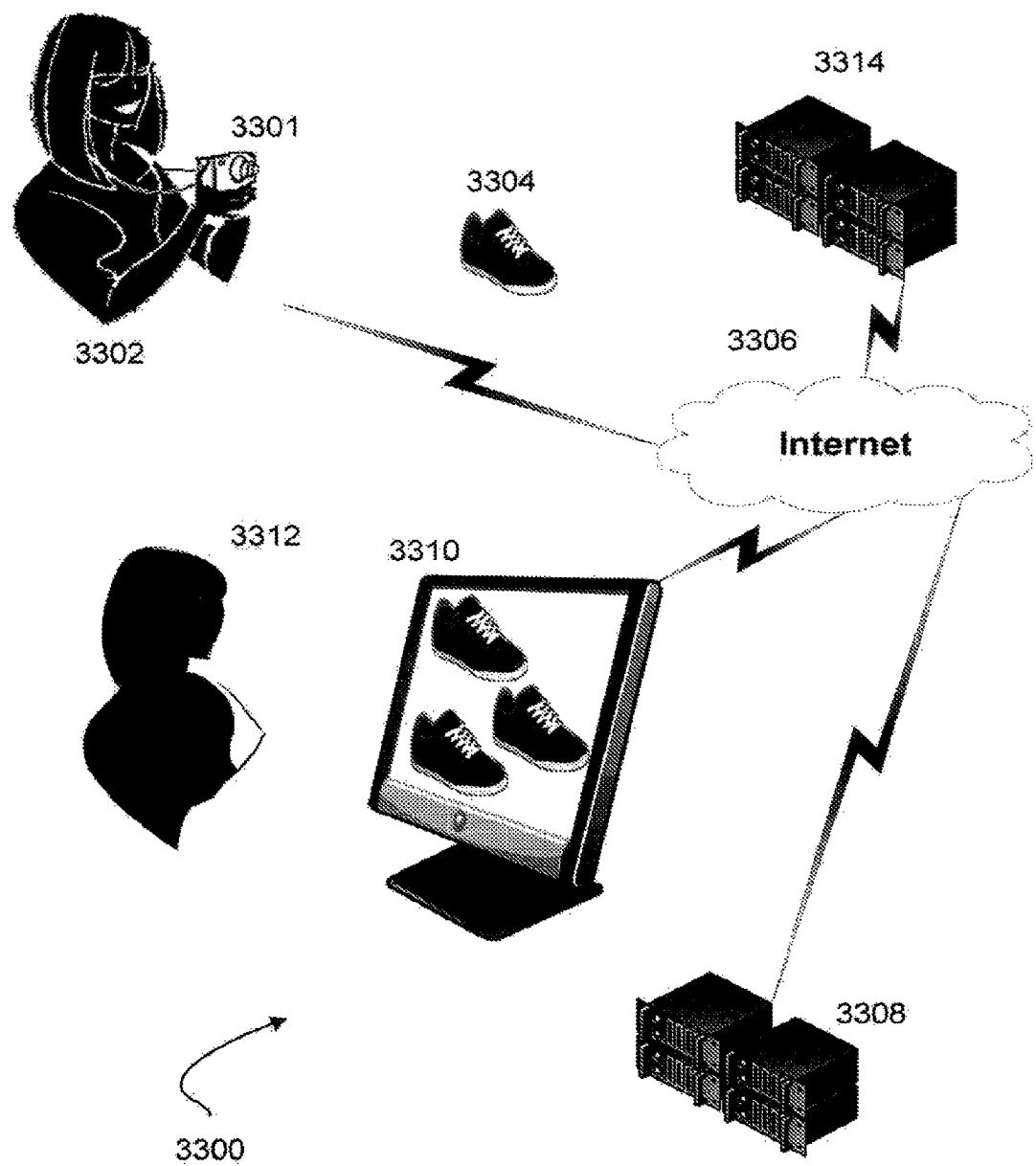
FIG. 12 is a scheme describing the system and process in accordance with an exemplary embodiment of the invention.

FIG. 12 is a scheme describing the system and process in accordance with an exemplary embodiment of the invention. System 3300 performs the process described hereinafter: Person 3302 captures using capturing means 3301 a visual object of tangible object 3304. The Visual object is sent over a network 3306 such as the internet to a processing system 3308. Processing system is comprised of multiple processing units configured to allow larger scale processing. In some cases it contains multi-core processors. System 3308 runs the modules of system 3100. Objects that were not found as CC or in risk of being CC are sent over network such as 3306 to a user terminal 3310. User terminal 3310 displays the results, such as marketplace user interface to user 3312.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Variations of embodiments described will occur to persons of the art. Therefore, the scope of the invention is limited only by the elements and limitations as used in the claims, wherein the terms "comprise," "include," "have" and their conjugates, shall mean, when used in the claims, "including but not necessarily limited to."

What is claimed is:

1. A method for labeling clusters of visual objects, comprising:
using at least one processor for executing the following:
code instructions for identifying a plurality of records each comprising at least one object image associated with at least one textual field;
code instructions for applying a visual analysis of a visual similarity between respective said object images of said plurality of records to yield a plurality of sub clusters;

code instructions for uniting said plurality of sub clusters into a plurality of clusters according to text similarity between said object images by applying a text similarity function on each said at least one textual field;

code instructions for labeling each cluster of the plurality of clusters with a label reflecting a common semantic factor of respective said textual fields of members in each cluster;

code instructions for displaying a catalog wherein the label of each cluster of the plurality of clusters is presented in association with the representative image thereof, the catalog is displayed as part of a user interface at a user terminal;

wherein the visual similarity provides a measure of resemblances between two visual objects based on local descriptors in the visual objects.

2. The method according to claim 1, wherein said code instructions for labeling comprises code instructions for applying a dictionary function to the textual fields of each cluster of the plurality of clusters.

3. The method according to claim 1, wherein said code instructions for labeling comprises:

code instructions for selecting a category dictionary for each cluster of the plurality of clusters based on the textual fields of each cluster of the plurality of clusters and editing the label of each cluster of the plurality of clusters by omitting or adding words based on a respective selected category dictionary.

4. The method according to claim 1, further comprising using said at least one processor for executing the following:

code instructions for obtaining a representative image of each cluster of the plurality of clusters; and code instructions for displaying a catalog wherein the label of each cluster of the plurality of clusters is presented in association with the representative image thereof, the catalog is displayed as part of a user interface at a user terminal.

5. The method according to claim 4, wherein the representative image is replaced by an image of one of the records having a greatest visual similarity with the images of the records.

6. The method according to claim 1, wherein the common semantic factor has a value above a specified threshold.

7. The method according to claim 1, wherein said combination further comprising a location based analysis of image capturing location data from said plurality of records.

8. The method according to claim 1, wherein the plurality of records contains a number of records each associated with at least one object image, wherein the number is above a specified level.

9. The method according to claim 1, wherein each one of the plurality of records is associated with at least one sale or display for sale of the at least one object.

10. The method according to claim 1, further comprising using said at least one processor for executing the following:

code instructions filtering out outlier records, wherein an object image of an outlier record exhibits a visual similarity below a specified level or a contextual similarity below a specified level in view of the object images or textual fields respectively of at least some of the records of the plurality of the records.

11. The method according to claim 1, further comprising using said at least one processor for executing the following:

code instructions filtering out copyrighted records, wherein a copyrighted object image of a copyrighted record exhibits a visual similarity above a specified level with an object image ranked above a specified level of relevance retrieved by an image search engine applied to at least one textual field associated with the object image.

12. The method of claim 1, wherein the visual similarity is calculated simultaneously on multiple processors.

13. A system for labeling clusters of visual objects, comprising:

a memory comprising a code;

at least one processor adapted to execute said code in which said code comprising:

code instructions for identifying a plurality of records each comprising at least one object image associated with at least one textual field;

code instructions for applying a visual analysis of a visual similarity between respective said object images of said plurality of records to yield a plurality of sub clusters;

code instructions for uniting said plurality of sub clusters into a plurality of clusters according to text similarity between said object images by applying a text similarity function on each said at least one textual field;

code instructions for labeling each cluster of the plurality of clusters with a label reflecting a common semantic factor of respective said textual fields of members in each cluster;

code instructions for displaying a catalog wherein the label of each cluster of the plurality of clusters is presented in association with the representative image thereof, the catalog is displayed as part of a user interface at a user terminal;

wherein the visual similarity provides a measure of resemblances between two visual objects based on local descriptors in the visual objects.

14. The system according to claim 13, wherein said at least one processor is adapted to execute said code in which said code further comprises code instructions for filtering out outlier records from said plurality of records, wherein an object image of an outlier record exhibits a visual similarity below a specified level or a contextual similarity below a specified level in view of the object images or textural fields respectively of at least some of the records of the plurality of the records.

15. The system according to claim 13, wherein said at least one processor is adapted to execute said code in which said code further comprises code instructions for filtering out copyrighted records from said plurality of records, wherein a copyrighted object image of a copyrighted record exhibits a visual similarity above a specified level with an object image ranked above a specified level of relevance retrieved by an image search engine applied to at least one textual field associated with the object image.

16. The system according to claim 13, wherein said at least one processor is adapted to execute said instructions for identifying said plurality of records in response to a query from at least one public image databases.

17. The system of claim 13, wherein the at least one processor comprises multiple processors.

18. A computer program product for building a catalog using visual objects, the computer program product having a non-transitory computer readable medium which comprises:

a non transitory computer readable storage medium having computer readable program embodied therewith, the computer readable program comprising:

computer readable program configured to identity a plurality of records each comprising at least one object image associated with at least one textual field;

computer readable program configured to apply
a visual analysis of a visual similarity between respective said object images of said plurality of records to yield a plurality of sub clusters;
code instructions for uniting said plurality of sub clusters into a plurality of clusters according to text similarity between said object images by applying a text similarity function on each said at least one textual field;

computer readable program configured to label each cluster of the plurality of clusters with a label reflecting a common semantic factor of respective said textual fields of members in each cluster;

computer readable program configured to display a catalog wherein the label of each cluster of the plurality of clusters is presented in association with the representative image thereof, the catalog is displayed as part of a user interface at a user terminal;

wherein the visual similarity provides a measure of resemblances between two visual objects based on local descriptors in the visual objects.

* * * * *